United States Patent Office 3,213,115

Patented Oct. 19, 1965

1

3,213,115

METHYL 16,17β-(1′,2′-Δ2′-CYCLOHEXENO) - 4,4,14-TRIMETHYL - 3′ - ISOPROPYL-Δ8-ANDROSTENE-3β-OL-15-ONE-6′α-CARBOXYLATE AND INTERMEDIATES IN THE PREPARATION THEREOF

Josef Fried, Princeton, N.J., assignor to Olin Mathieson Chemical Corporation, New York, N.Y., a corporation of Virginia

No Drawing. Filed Oct. 11, 1963, Ser. No. 315,715
10 Claims. (Cl. 260—397.1)

This invention relates to and has as its object the provision of new physiologically active steroids, processes for their preparation and novel intermediates useful in said preparation.

The final products of this invention may be represented by the following formula:

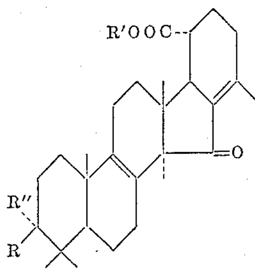

wherein R′ is selected from the group consisting of hydrogen and lower alkyl; R″ is hydrogen; R is selected from the group consisting of hydroxy and acyloxy; and together R and R″ is oxo.

The compounds of this invention are physiologically active compounds which possess anti-androgenic activity,

2 i.e., they inhibit the action of androgens, and thus may be employed in the treatment of such conditions as hyperandrogenic acne. The compounds may be formulated for such administration, the concentration and/or dosage being based on the activity of the particular compound and the requirements of the patient.

It has also been found that the 21-oic acid compounds of this invention possess anti-inflammatory activity and hence may be employed to treat and repress inflammatory conditions. The compounds of this invention may be used in the treatment of such conditions and diseases as inflammatory diseases of the skin, eye, ear and nose. The compounds may be formulated for such administration, the concentration and/or dosage being based on the activity of the particular compound and the requirements of the patient.

The preferred acyl and acyloxy radicals are those of hydrocarbon carboxylic acids of less than twelve carbon atoms, as exemplified by the lower alkanoic acids (e.g., acetic, propionic, butyric and tert-pentanoic acid), the lower alkenoic acids, the monocyclic aryl carboxylic acids (e.g., benzoic and toluic acid), the monocryclic aryl lower alkanoic acids (e.g., phenacetic and β-phenylpropionic acid), the cycloalkane carboxylic acids and the cycloalkene carboxylic acids.

The final products of this invention may be prepared by the novel processes of this invention beginning with methyl sulfurenate as starting material. The methyl sulfurenate starting material may be prepared in accordance with the teachings and disclosures of copending application, Serial No. 308,677, filed September 13, 1963, in the name of Josef Fried.

The novel processes of this invention may be represented by the following equations where R, R′ and R″ may represent hydrogen, acyl or oxo (O=):

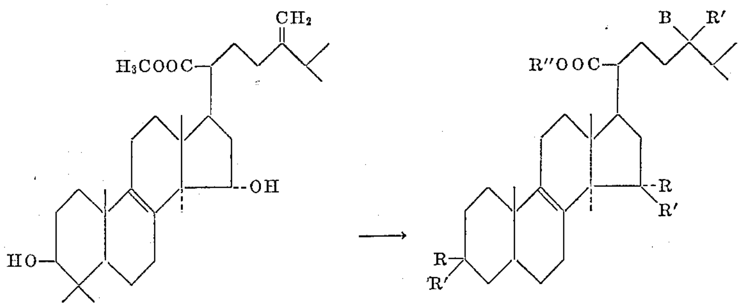

Methyl sulfurenate (A)

I. R′=H; R=OH; R″=CH3; B=OH
II. R + R′=O=; R″=CH3 B+R′=O=
III. R′=H; R=OH; R″=H; B=O O
IV. R + R′=O=; R″=H; B+R=O=
V. R′=H; R=CH3COO; R″=CH3 B+R′=O=
VII. B+R″=O=; R′=H; R=OH; R″=CH3
VIII. R=OH; R′=H; B+R′=O=; R″=H

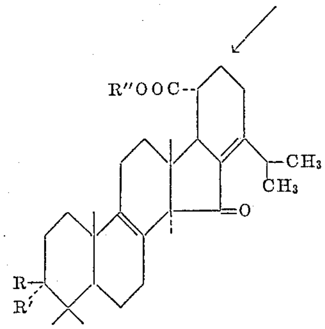

(B)

VI. R=OH; R′=H; R″=CH3
IX. R+R′=O=; R″=CH3
X. R=CH3COO; R′=H; R″=CH3

In the first step of the novel processes of this invention, methyl sulfurenate is first ozonized as by treatment with ozone, and the resulting ozonide reduced, as by treatment with zinc dust in acetic acid to yield the 24-keto ester (Compound VII).

The 24-keto ester (Compound VII) may then, it has surprisingly been found, be hydrolized as by refluxing with 0.5 N to 1 N alcoholic alkali metal hydroxide, e.g. ethanolic potassium hydroxide or methanolic sodium hydroxide, to yield the 21-carboxylic acid derivatives (Compound VIII).

It has also been found that the 24-keto esters (Compound VII) may be converted to the 24-hydroxy esters (Compound III) as by treatment with an alkali metal borohydride, for example, potassium borohydride. The 24-hydroxy esters (Compound III) may then be treated in the same manner as described hereinabove for obtaining the 21-carboxylic acid derivatives of the 24-keto esters.

The 24-keto esters may then be cyclized as by treatment with an alkali metal tert. butoxide, e.g. potassium tert. butoxide, to yield the final products of the instant invention (Compound B), which are new compounds of this invention.

This invention may be further illustrated by the following examples:

EXAMPLE 1

*Methyl 3β,15α-dihydroxy-24-keto-$\Delta^8$-lanostene-21-oate*

A solution of five grams of methyl sulfurenate in 140 ml. of methylene chloride and 140 ml. of ethyl acetate is ozonized until the emerging gas liberates iodine from a KI solution placed after the ozonization vessel. To the resulting solution is added five ml. of acetic acid and ten grams of zinc dust (in portions) and the resulting suspension is stirred until it no longer blued starch iodide reagent. The mixture is then filtered and the filtrate extracted with dilute sodium bicarbonate and water. The solvents are removed in vacuo and the resulting residue (5 grams) dissolved in 200 ml. of benzene and chromatographed on 250 grams of neutral alumina. Elution with nine parts of benzene and one part of chloroform (6.6 liters) followed by 300 ml. of chloroform-benzene 1:4 produces 3.74 grams of material. Crystallization of this material from methanol furnishes 1.9 grams of the pure 24-keto ester VII, possessing the following properties: M.P. 179–181°, $[\alpha]_D^{23}$ +56° (c., 1.0 in chloroform), $\lambda_{max.}^{KBr}$ 2.82, 2.96, 3.14, 5.81μ

*Analysis.*—Calc'd for $C_{31}H_{50}O_5$ (502.71): C, 74.06; H, 10.03. Found: (after drying for two hours at 125°): C, 73.81; H, 9.97.

EXAMPLE 2

*3β,15α-dihydroxy-24-keto-$\Delta^8$-lanostene-21-oic acid*

A solution of 500 mg. of methyl 3β,15α-dihydroxy-24-keto-$\Delta^8$-lanostene-21-oate in 50 ml. of an oxygen-free KOH solution prepared by mixing 72 ml. of 5% ethanolic KOH with 4.6 ml. of water is refluxed under a gentle stream of helium for six hours. The mixture is cooled, diluted with water and the alcohol evaporates in vacuo. The mixture is acidified with glacial acetic acid, the resulting suspension extracted with methyl isobutyl ketone, the methyl isobutyl ketone solution washed with water and the solvent evaporates to dryness in vacuo. The residue (500 mg.) on recrystallization from methanol furnishes pure 3β,15α - dihydroxy - 24-keto-$\Delta^8$-lanostene-21-oic acid (345 mg.) possessing the following properties: M.P. 265–267°; $[\alpha]_D^{23}$ +58° (c., 0.26 in 95% ethanol);

$\lambda_{max.}^{KBr}$ 2.95, 5.86μ

*Analysis.*—Calc'd for $C_{30}H_{48}O_5 \cdot H_2O$: C, 71.11; H, 9.55. Found (after drying for eighteen hours at 100°): C, 71.36; H, 9.71. Calc'd for $C_{39}H_{48}O_5$: C, 73.73; H, 9.90. Found (after drying to concentrate at 150°): C, 73.85; H, 9.96.

EXAMPLE 3

*Methyl 3,15,24-triketo-$\Delta^8$-lanostene-21-oate*

A soultion of 75 mg. of methyl 3β,15α-dihydroxy-24-keto-$\Delta^8$-lanostene-21-oate in 5 ml. of reagent acetone is oxidized with 1.2 ml. of Jones chromic trioxide reagent containing 20 mg. of chromium trioxide per ml. Methanol is added to the mixture to reduce excess chromium trioxide and after the addition of water, the excess methanol is removed in vacuo. The steroids are extracted with chloroform, the chloroform solution washed with water, dried over sodium sulfate and evaporates to dryness in vacuo. The resulting residue gives the pure triketo ester (58 mg.) possessing the following properties: M.P. 176–177°, $[\alpha]_D^{23}$ +79° (c., 1.03), $\lambda_{max.}^{KBr}$ 5.76, 5.86μ

*Analysis.*—Calc'd for $C_{31}H_{46}O_5$ (498.68); C, 74.66; H, 9.30. Found (after drying for 1.5 hours at 125°): C, 74.73; H, 9.40.

EXAMPLE 4

*Methyl 3β,15α,24ξ-trihydroxy-$\Delta^8$-lanostene-21-oate*

To a solution of 30 mg. of potassium borohydride in 3 ml. of water and 3 ml. of dioxane is added 30 mg. of methyl 3β,15α-dihydroxy-24-keto-$\Delta^8$-lanostene-21-oate in 3 ml. of dioxane. The mixture is allowed to remain at room temperature for 45 minutes at which time excess potassium borohydride is destroyed by the addition of acetic acid. The mixture is extracted with chloroform and water, the chloroform-dioxane solution is washed with water and evaporates to dryness in vacuo. The residual trihydroxy acid methyl ester after recrystallization from acetone-hexane has the following properties: M.P. 185–186°; $[\alpha]_D^{23}$ +57° (c., 1.22 in chloroform);

$\lambda_{max.}^{KBr}$ 2.92, 5.80μ

*Analysis.*—Calc'd for $C_{31}H_{52}O_5$ (504.73): C, 73.76; H, 10.38. Found: C, 74.74; H, 10.44.

EXAMPLE 5

*3β,15α,24ξ-trihydroxy-$\Delta^8$-lanostene-21-oic acid*

A solution of 8 mg. of methyl 3β,15α,24ξ-trihydroxy-$\Delta^8$-lanostene-21-oate in 3.5 ml. of a solution prepared by mixing 72 ml. of ethanolic KOH (oxygen free) with 4.6 ml. of water is refluxed under helium for five hours. The solution is acidified with glacial acetic acid and the mixture extracted with methyl isobutyl ketone. After removal of the solvent in vacuo there remains crystalline 3β,15α,24ξ-trihydroxy-$\Delta^8$-lanostene-21-oic acid.

EXAMPLE 6

*3,15,24-triketo-$\Delta^8$-lanostene-21-oic acid*

To a solution of 500 mg. of potassium metal in 100 ml. of dry, distilled tert. butanol is added at room temperature 500 mg. of methyl 3,15,24-triketo-$\Delta^8$-lanostene-21-oate. The mixture is stirred under nitrogen at room temperature for two hours and twenty minutes after which time water is added and the mixture is neutralized by the addition of glacial acetic acid. The solution is concentrated to remove most of the tert. butanol and extracted with chloroform. The chloroform extract is evaporated to dryness in vacuo, and the residue is taken up in ether, whereupon crystallization takes place. The residual crystals after recrystallization from acetone represent essentially pure 3,15,24-triketo-$\Delta^8$-lanostene-oic acid possessing the following properties: M.P. 264–268

$\lambda_{max.}^{KBr}$ 3.05, 5.76 and 5.87μ; $\lambda_{max.}^{chlf.}$ 3–3.3μ (inflection), 5.76 and 5.87μ; $[\alpha]_D^{23}$ +81° (c., 1.03 in chloroform)

*Annalysis.*—Calc'd for $C_{30}H_{44}O_5$: C, 74.34; H, 9.15. Found: C, 74.45; H, 9.23; H, 9.23.

*EXAMPLE 7*

*Methyl 16,17β-(1′,2′-Δ$^{2'}$-cyclohexeno)-4,4,14-trimethyl-3′-isoproply-Δ$^{8}$-androstene-3,15-dione-6′α-carboxylate*

The ether mother liquor from the triketolanostenoic acid is methylated with excess diazomethane at room temperature for twenty minutes. The solution is concentrated to dryness in vacuo, and the residual crystalline material recrystallized first from ether and finally from methonol. There is obtained 45 mg. of the methyl ester possessing the following properties: M.P. 184–187°; $[\alpha]_D^{23}$ +89° (c., 0.31 in chloroform);

$\lambda_{max.}^{alc.}$ 251 mμ (ε=13,250), 351 mμ (ε=80, shoulder) 364 mμ (ε=65); $\lambda_{max.}^{KBr}$ 5.77, 5.88 and 6.18μ

*Analysis.*—Calc'd for $C_{31}H_{44}O_4$: C, 77,46; H, 9.23. Found: C, 77.48; H, 9.28.

The mother liquors from the cyrstallization of the above methyl ester are evaporated to dryness in vacuo, and the total residue (290 mg.) dissolved in 5 ml. of benzene and 50 ml. of hexane and the solution chromatographed on 10 g. of neutral alumina. Elution of the column with benzene-hexane 1:1 eluted in the first 600 ml. 52 mg. of crystalline material which after recrystallization from methanol melts at 183–185° (33 mg.) identical in all respects with the material described above. Continued elution of the column with the same solvent mixture (1,000 ml.) eluted 100 mg. of crude material, which is purified by preparative thin layers chromatography on activity V alumina using chloroform as the developing agent. There is isolated 33 mg. of crystalline material which after one recrystallization from methanol furnishes an additional 24 mg. of the methyl ester melting at 181–183°. The total yield from all these sources is 102 mg. of 22%.

EXAMPLE 8

*Methyl 3β,15α,24ξ-triacetoxy-Δ$^{8}$-lanostene-21-oate*

Methyl 3β,15α,24ξ-trihydroxy - Δ$^{8}$ - lanostene-21-oate is acetylated with pyridine and acetic anhydride for a total of twenty-four hours. Removal of the reagents furnishes a residue which is recrystallized from methanol. Recrystallization from that same solvent furnishes pure methyl 3β,15α,24ξ-triacetoxy-Δ$^{8}$-lanostene-21-oate.

EXAMPLE 9

*Methyl 16,17β-(1′,2′-Δ$^{2'}$-cyclohexeno)4,4,14-trimethyl-3′-isopropyl-Δ$^{8}$-androstene-3β-ol-15-one-6′α-carboxylate*

To a solution of 20 mg. of potassium borohydride in 2 ml. of dioxane and 2 ml. of water is added a solution of 20 mg. of methyl 16,17β-(1′,2′-Δ$^{2'}$-cyclohexeno)-4,4,14-trimethyl-3′-isopropyl-Δ$^{8}$ - androstene-3,15-dione-6′α-carboxylate in 2 ml. of dioxane. After 45 minutes at room temperature, excess potassium borohydride is destroyed by the addition of acetic acid and the mixture extracted with chloroform. The chloroform-dioxane solution is washed with water and evaporated to dryness in vacuo. The residue is recrystallized from methanol, yielding methyl 16,17β-(1′,2′-Δ$^{2'}$ - cyclohexeno) - 4,4,14-trimethyl-3′-isopropyl-Δ$^{8}$-androstene-3β-ol-15-one-6′α-carboxylate.

The invention may be variously otherwise embodied within the scope of the appended claims.

What is claimed is:

1. A compound of the formula:

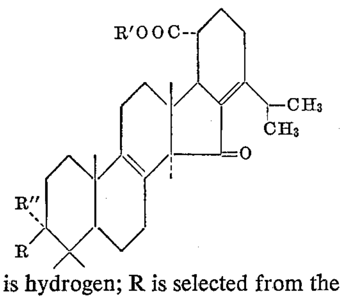

wherein R″ is hydrogen; R is selected from the group consisting of hydroxy and acyloxy, wherein the acyl radical is of a hydrocarbon carboxylic acid of less than twelve carbon atoms; and R′ is selected from the group consisting of hydrogen and lower alkyl.

2. A compound selected from the group consisting of steroids of the formula:

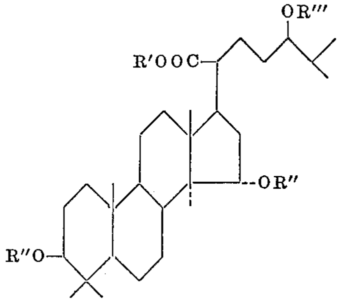

wherein R′ is selected from the group consisting of hydrogen and lower alkyl; and each R‴ is selected from the group consisting of hydrogen and acyl wherein the acyl radical is of a hydrocarbon carboxylic acid of less than twelve carbon atoms.

3. Methyl 3,15,24-triketo-Δ$^{8}$-lanostene-21-oate.

4. Methyl 3β,15α,24ξ-trihydroxy-Δ$^{8}$-lanostene-21-oate.

5. 3β,15α,24ξ-trihydroxy-Δ$^{8}$-lanostene-21-oic acid.

6. 3,15,24-triketo-Δ$^{8}$-lanostene-21-oic acid.

7. Methyl 16,17β-(1′,2′-Δ$^{2'}$-cyclohexeno) - 4,4,14 - trimethyl-3′-isopropyl-Δ$^{8}$-androstene-3,15-dione-6′α - carboxylate.

8. Methyl 16,17β-(1′,2′-Δ$^{2'}$-cyclohexeno) - 4,4,14 - trimethyl-3′-isopropyl-Δ$^{8}$-androstene - 3β-ol-15-one-6′α-carboxylate.

9. The process for preparing the compounds of the formula:

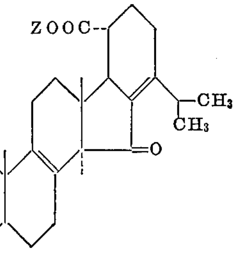

wherein R is hydrogen; Q is selected from the group consisting of hydroxy and acyloxy, and together Q and R is oxo (O═); and Z is selected from the group consisting of hydrogen and lower alkyl; which comprises cyclizing a compound of the formula:

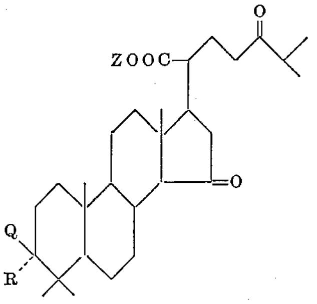

wherein Q, R and Z are as hereinbefore defined, by treatment with alkali metal tert. butoxide.

10. The process of claim 9, wherein the alkali metal tert. butoxide is potassium tert. butoxide.

References Cited by the Examiner

UNITED STATES PATENTS 2,870,142 1/59 Wettstein ---------- 260—239.55

LEWIS GOTTS, *Primary Examiner.*

ELBERT L. ROBERTS, *Examiner.*

UNITED STATES PATENT OFFICE
CERTIFICATE OF CORRECTION

Patent No. 3,213,115 October 19, 1965

Joseph Fried

It is hereby certified that error appears in the above numbered patent requiring correction and that the said Letters Patent should read as corrected below.

Column 2, line 22, for "monocryclic" read -- monocyclic --; same column 2, the second formula should appear as shown below instead of as in the patent:

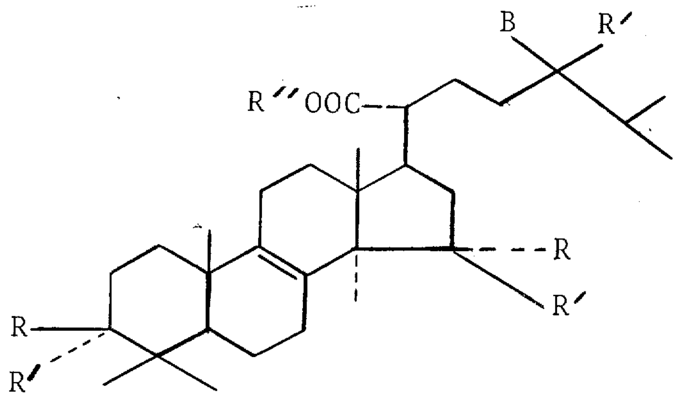

same column 2, under the second formula, for "III. R′=H; R=OH; R″=H; B=OO" read -- III. R′=H; R=OH; R″=H; B=OH --; column 5, line 2, for "-isoproply", in italics, read -- isopropyl --, in italics; line 28, for "layers" read -- layer --.

Signed and sealed this 7th day of June 1966.

(SEAL)
Attest:

ERNEST W. SWIDER
Attesting Officer

EDWARD J. BRENNER
Commissioner of Patents